US007650778B2

(12) United States Patent
Puckett et al.

(10) Patent No.: US 7,650,778 B2
(45) **Date of Patent: *Jan. 26, 2010**

(54) METHOD AND APPARATUS FOR TESTING A GEAR-DRIVEN FUEL PUMP ON A FUEL INJECTED IC ENGINE

(75) Inventors: Daniel Reese Puckett, Peoria, IL (US); Faith Juliet McKenzie, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 79 days.

This patent is subject to a terminal disclaimer.

(21) Appl. No.: 11/976,163

(22) Filed: Oct. 22, 2007

(65) Prior Publication Data

US 2008/0302174 A1 Dec. 11, 2008

Related U.S. Application Data

(60) Provisional application No. 60/924,917, filed on Jun. 5, 2007.

(51) Int. Cl.
*G01M 15/09* (2006.01)

(52) U.S. Cl. .................................................... 73/114.41

(58) Field of Classification Search .. 73/114.38–114.54
See application file for complete search history.

(56) References Cited

U.S. PATENT DOCUMENTS

| | | | | | |
|---|---|---|---|---|---|
| 5,020,362 | A | * | 6/1991 | Hart et al. | 73/114.43 |
| 5,076,320 | A | | 12/1991 | Robinson | |
| 5,277,162 | A | | 1/1994 | Smith et al. | |
| 5,445,019 | A | * | 8/1995 | Glidewell et al. | 73/114.51 |
| 5,485,820 | A | | 1/1996 | Iwaszkiewicz | |
| 5,492,099 | A | * | 2/1996 | Maddock | 123/446 |
| 5,633,458 | A | * | 5/1997 | Pauli et al. | 73/114.51 |

(Continued)

FOREIGN PATENT DOCUMENTS

EP 0 501 459 A2 9/1992

*Primary Examiner*—Lisa M Caputo
*Assistant Examiner*—Freddie Kirkland, III
(74) *Attorney, Agent, or Firm*—Finnegan, Henderson, Farabow, Garrett & Dunner; Carl E. Myers

(57) ABSTRACT

Methods and apparatus are provided for testing a fuel pump in a fuel supply system on a IC fuel injected engine, the pump having a pumping element for supplying fuel injectors via a fuel rail. The method includes providing a pump element pumping event; disabling overlapping injectors during a test-period that includes the pumping event; measuring pressure in the rail at least two engine crank angles surrounding the pumping event during the test period; and determining a fuel delivery rate value for the pump based on the measured rail pressures. Methods and apparatus also are provided for determining quantitative leakage rate in the fuel supply system of a fuel injected IC engine, the fuel system including a fuel pump with one or more pumping elements supplying injectors via a fuel rail. The method includes establishing steady state engine operating conditions with fuel rail pressure at a predetermined value; disabling all overlapping injectors and all pumping events during a test period; measuring rail pressure at preselected first and second crank angles during the test period, the first crank angle being advanced relative to the second crank angle; and calculating the leakage rate based on a pressure drop determined from the measured rail pressure at the first crank angle and the measured rail pressure at the second crank angle.

20 Claims, 7 Drawing Sheets

U.S. PATENT DOCUMENTS

| | | | | |
|---|---|---|---|---|
| 5,708,202 | A | 1/1998 | Augustin et al. | |
| 5,715,786 | A * | 2/1998 | Seiberth | 123/198 D |
| 6,422,203 | B1 | 7/2002 | Djordjevic | |
| 6,526,947 | B2 * | 3/2003 | Shimada et al. | 123/495 |
| 6,672,285 | B2 | 1/2004 | Smith et al. | |
| 6,715,469 | B2 | 4/2004 | Ishimoto | |
| 6,758,656 | B2 | 7/2004 | Maier et al. | |
| 6,814,059 | B2 | 11/2004 | Ito et al. | |
| 7,007,676 | B1 * | 3/2006 | Schuricht et al. | 123/479 |
| 7,240,666 | B2 | 7/2007 | Okamoto | |
| 7,337,652 | B2 * | 3/2008 | Shamine | 73/40 |
| 7,370,638 | B2 * | 5/2008 | Hayakawa | 123/467 |
| 7,392,792 | B2 * | 7/2008 | Puckett | 123/456 |
| 7,444,993 | B2 * | 11/2008 | Hofmeister | 123/479 |
| 2001/0006061 | A1 | 7/2001 | Shimada et al. | |
| 2001/0043874 | A1 | 11/2001 | Sano et al. | |
| 2004/0000288 | A1 * | 1/2004 | Puckett | 123/446 |
| 2004/0011889 | A1 | 1/2004 | Boecking | |
| 2006/0130560 | A1 | 6/2006 | Shamine | |
| 2007/0079792 | A1 * | 4/2007 | Dingler et al. | 123/198 D |
| 2008/0022973 | A1 * | 1/2008 | Puckett et al. | 123/446 |
| 2008/0041331 | A1 * | 2/2008 | Puckett | 123/198 D |
| 2008/0109152 | A1 * | 5/2008 | Puckett | 701/115 |
| 2008/0302175 | A1 * | 12/2008 | Puckett et al. | 73/114.41 |

* cited by examiner

METHOD AND APPARATUS FOR TESTING A GEAR-DRIVEN FUEL PUMP ON A FUEL INJECTED IC ENGINE

This application claims priority to Provisional Application No. 60/924,917 filed Jun. 5, 2007, and is related to application Ser. No. 11/976,164 filed concurrently herewith and entitled "Method and Apparatus for Determining Correct Installation for Gear-Driven Fuel Pump on a Fuel Injected IC Engine."

TECHNICAL FIELD

The present disclosure relates to service tests for fuel injected internal combustion (IC) engines. Specifically, the present disclosure relates to a diagnostic procedure for testing a fuel pump for supplying a common rail on a fuel injected IC engine. The present disclosure also relates to testing the installed fuel rail system to determine the leakage rate.

BACKGROUND

Failure to maintain adequate and stable fuel rail pressure by fuel pumps installed in fuel injected IC engines can result in poor or erratic fuel injector performance and inefficient engine performance. Conventional test methods are cumbersome and time consuming, some requiring the pump to be removed from the engine and bench tested. Moreover, low fuel rail pressure can be caused not only by a defective or degraded pump, but also by excessive leakage from the fuel rail during engine operation. Consequently, a diagnostic procedure with the pump installed ideally should allow the test operator to determine if one or more of the pump pumping elements is the cause of poor performance rather than, or in addition to, excessive rail leakage.

Methods for testing installed fuel supply systems are known but are relatively complex or do not provide quantitative results. For example, EP 0 501 459 discloses a method detecting pump-abnormality or failure by monitoring and tracing the output signal from a common rail pressure sensor to detect a rail pressure variation pattern (i.e., pressure vs. time curve). The curve is then compared with patterns/curves corresponding to normal pump operation to detect pump-abnormality/failure. For multiple pumps, the method alternatively suspends operation in the other pump when the pressure curve for one pump is being recorded. EP 0 501 459 also discloses that the pump failure detecting method can be provided in a program installed in a vehicle's electronic control unit ("ECU").

U.S. Pat. No. 5,708,202 to Augustine et al. discloses a method for testing for unacceptable leakage in a fuel injection system installed on an IC engine. The method includes measuring pressure in the common fuel rail at two points in time between a fuel injection event and an immediately prior or subsequent pump delivery event. Any difference in measured pressure such as due to system fuel leakage is compared with a predetermined acceptable threshold value. If the pressure difference exceeds the threshold, an "operating error" is indicated. The method also contemplates switching off momentarily at least one of successive fuel injection events and pump delivery events, to detect small leakage volumes. Further, the leakage detection method may be accomplished using the engine ECU to momentarily switch off the selected injector and pump delivery events.

SUMMARY OF THE DISCLOSURE

In one aspect of the present disclosure, apparatus is disclosed for testing a fuel pump in fuel supply system on a fuel injected IC engine the pump having a pumping element for supplying fuel injectors via a fuel rail. The apparatus includes a computer interconnectable to the engine and programmed with software for providing a pump element pumping event, software for disabling overlapping injectors during a test period that includes the pumping event, and software for measuring pressure in the rail at least two engine crank angles surrounding the pumping event during the test period. The apparatus also includes software for determining a pump fuel delivery rate value based on the measured rail pressures.

In another aspect of the present disclosure, a method is disclosed for testing a fuel pump in a fuel supply system on a IC fuel injected engine, the pump having a pumping element for supplying fuel injectors via a fuel rail. The method includes providing a pump element pumping event, disabling overlapping injectors during a test-period that includes the pumping event, and measuring pressure in the rail at least two engine crank angles surrounding the pumping event during the test period. The method further includes determining a fuel delivery rate value for the pump based on the measured rail pressures.

In yet another aspect of the present disclosure, a method is disclosed for determining quantitative leakage rate in a fuel supply system of a fuel injected IC engine, the fuel system including a fuel pump with one or more pumping elements supplying injectors via a fuel rail. The method includes establishing steady state engine operating conditions with fuel rail pressure at a predetermined value, disabling overlapping injectors and all pumping events during a test period, and measuring rail pressure at preselected first and second crank angles during the test period, the first crank angle being advanced relative to the second crank angle. The method also includes calculating the leakage rate based on a pressure drop determined from the measured rail pressure at the first crank angle to the measured rail pressure at the second crank angle.

DETAILED DESCRIPTION

In one aspect of the present disclosure, as broadly disclosed and claimed herein, apparatus is disclosed for testing the performance of a fuel pump installed in a fuel injected IC engine to supply injectors via a fuel rail.

Figure 1:
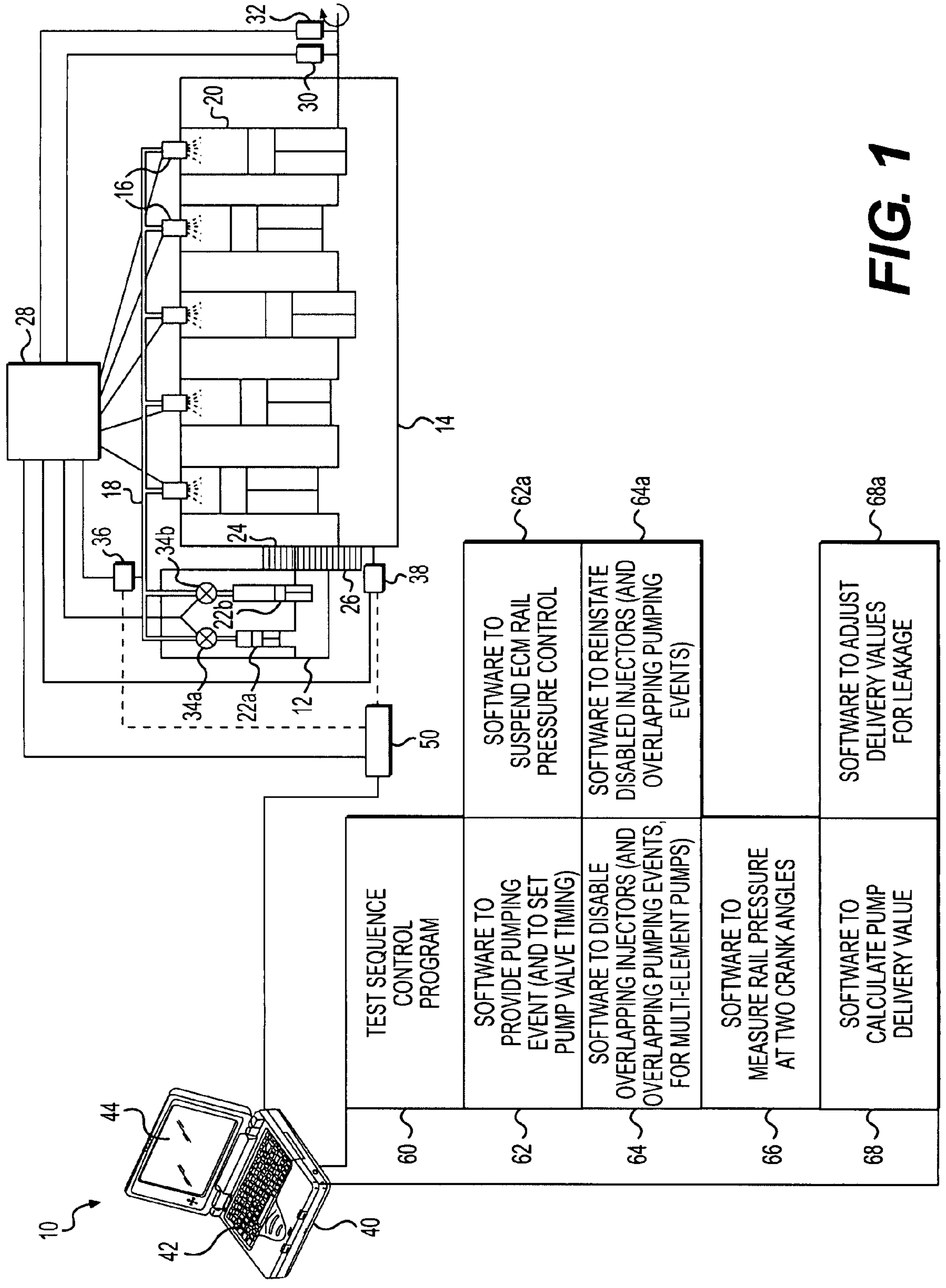
FIG. 1 is a schematic showing apparatus for testing the performance of a fuel pump installed on an injected IC engine, in accordance with one aspect of the present disclosure.

As embodied herein, and with initial reference to FIG. 1, apparatus generally designated by the numeral 10 is shown for testing fuel pump 12 installed on IC engine 14. Engine 14, which may be a diesel engine as depicted, is fuel injected via injectors 16 each supplied from a fuel rail 18, as is commonly known. In the FIG. 1 embodiment, engine 14 has a total of five cylinders/piston assemblies 20 arranged in an in-line configuration. In the FIG. 1 embodiment, pump 12 may be a piston-type pump and include two pump elements 22*a*, and 22*b*, for supplying fuel from a fuel source (not shown) to fuel rail 18. In the depicted embodiment, pump 12 is a gear-driven pump, with both pump elements 22*a*, 22*b* interconnected and driven by pump gear 24. Pump gear 24, in turn, is driven by a gear, such as engine gear 26, connected to the engine power train. However, the present disclosure is not restricted to testing gear driven fuel pumps.

In addition to providing power to pump 12 from engine 14, the geared connection between engine gear 26 and pump gear 24 provide coordination between the timing (engine crank angle) positions of the pistons in cylinders 20 and the power strokes of the individual pump elements 22*a*, 22*b*. Also, as depicted in FIG. 1, engine electronic control module (ECM) 28 may conventionally control operation of the injectors 16 based on piston position in the respective cylinders 20, engine speed (RPM), and/or load as determined from the input of various sensors, such as speed sensor 30 and torque sensor 32. In certain embodiments, ECM 28 may also control the fuel flow output to rail 18 from each of pump elements 22*a*, 22*b* via solenoid control valves 34*a*, 34*b*, as depicted in FIG. 1. Valves 34*a*, 34*b* may be variable opening timing angle valves where valve operation can be controlled by current supplied at times corresponding to different engine crank angles depending upon other engine variables such as engine speed. Appropriate start of current ("SOC") angle values of the pump valve timing maybe stored in ECM 28 as a "map" with the engine variables being the coordinates, as one skilled in the art would understand. In some embodiments the ECM, such as ECM 28 in FIG. 1, may also control fuel rail pressure in fuel rail 18 to predetermined levels during operation.

It should be understood that the apparatus and methods of the present disclosure are not limited to use with a IC engine of the type shown in FIG. 1, which embodiment is for the purpose of explaining the disclosure. Rather, the apparatus and methods of the present disclosure may be used with engines with a single fuel pump element, as well as engines with more than two pump elements. Also, the apparatus and methods of the present disclosure may be used with engines having a greater or lesser number of fuel injected piston/cylinders arranged in any one of a number of other conventional configurations (V-shape, flat-opposed, etc.). Still further, the IC engines may be supplied with fuels other than diesel fuel.

With continued reference to FIG. 1, apparatus 10 includes a computer 40 that includes programmed software 60 for control of the testing sequence including software used to carry out some or all of the elements of the methods of the present disclosure (to be discussed herewith). Computer 40 also may be programmed to receive and process information regarding one or more engine operating parameters such as engine speed (RPM), engine coolant temperature, fuel rail pressure, pump solenoid valve position, engine timing (crank angle), vehicle speed, and engine load that may be required to enable the testing.

As depicted in FIG. 1, computer 40 is a general purpose digital computer that can be suitably programmed with software to receive and process engine parametric information as well as control the testing in accordance with the methods of the present disclosure, which will be discussed henceforth. Computer 40 may be a lap-top computer and include a conventional keyboard 42 for enabling operator input such as starting, stopping, pausing, restarting, etc., of the testing sequence. Other input means may be used, such as touch-screen, mouse-activated, etc. Computer 40 may also include a screen, such as screen 44, for displaying information, including the received engine operating parameter information as well as the processed information (status of testing, test results, etc.). Alternatively, computer 40 may be a special purpose computer such as a microcontroller with firmware for providing some or all of the testing functions otherwise provided by software.

In the FIG. 1 embodiment, computer 40 is operatively interconnected to ECM 28 of engine 14 via service tool 50 to provide control of engine 14 and pump 12 during testing. Computer 40 may receive engine parametric information from ECM 28 indirectly through service tool 50, such as one or more of engine speed (RPM), load (torque×RPM), and engine timing (crank angle), which information may already be in digital form. Service tool 50 may also be configured to receive one or more inputs directly from certain sensors on engine 14, such as engine coolant temperature sensor 38, and fuel rail pressure input sensor 36, if not available through ECM 28. For such direct inputs, service tool 50 may include appropriate signal conditioning equipment e.g. A/D converters for analog sensors, as necessary.

In accordance with the first aspect of the present disclosure, the testing apparatus further includes software for providing at least one pumping event. As embodied herein and with continued reference to FIG. 1, computer 40 may include programmed software 62 to operate engine 14 during the testing sequence to provide pumping events. For the FIG. 1 embodiment, having a second pumping element 22*b*, the pumping events of pump element 22*a* would alternate with pumping events of pump element 22*b*, as shown in FIG. 2, which depicts an exemplary test sequence for the FIG. 1 embodiment.

The programmed software 62 in computer 40 may also function to override certain functions of the engine control program in engine ECM 28 to allow testing, or it may be an entirely separate program for controlling engine 14 during testing. In either case, engine control by computer 40 may be achieved through interconnection with ECM 28, which may occur through service tool 50. Such control may include causing pump 12 and engine 14 to first operate normally for a period of time sufficient to establish steady state conditions (e.g. one or more of predetermined speed (RPM), engine coolant temperature, engine load, etc.). In some embodiments, the engine ECM may be configured to provide fuel rail pressure control, as mentioned previously. In such embodiments, software 62 may specifically include suitable software 62*a* for overriding ECM 28 control of the fuel rail pressure during the test sequence.

Still further in accordance with the first aspect of the present disclosure, the apparatus includes software for disabling "overlapping" injectors during a test period that includes the selected pumping event. In the exemplary embodiment of FIG. 1, the disabling software 64 programmed in computer 40 and associated controlled hardware suspends any "overlapping" fuel injector 16 injection events that would otherwise occur during the test period. That is, if fuel rail pressure due to a selected pumping event of pump element 22*a* were to be measured during a period of time surrounding the pump event, the occurrence of other "events" influencing pressure in the fuel rail during that time period should be eliminated, or at least their effects minimized, to better isolate the effect of the operation of the pump element being tested. Hence, operation of one or more fuel injectors 16 that would normally operate during the test period are disabled, as they would otherwise cause a drop in pressure in fuel rail 18 pressure due to fuel outflow to the respective cylinder.

Figure 2:
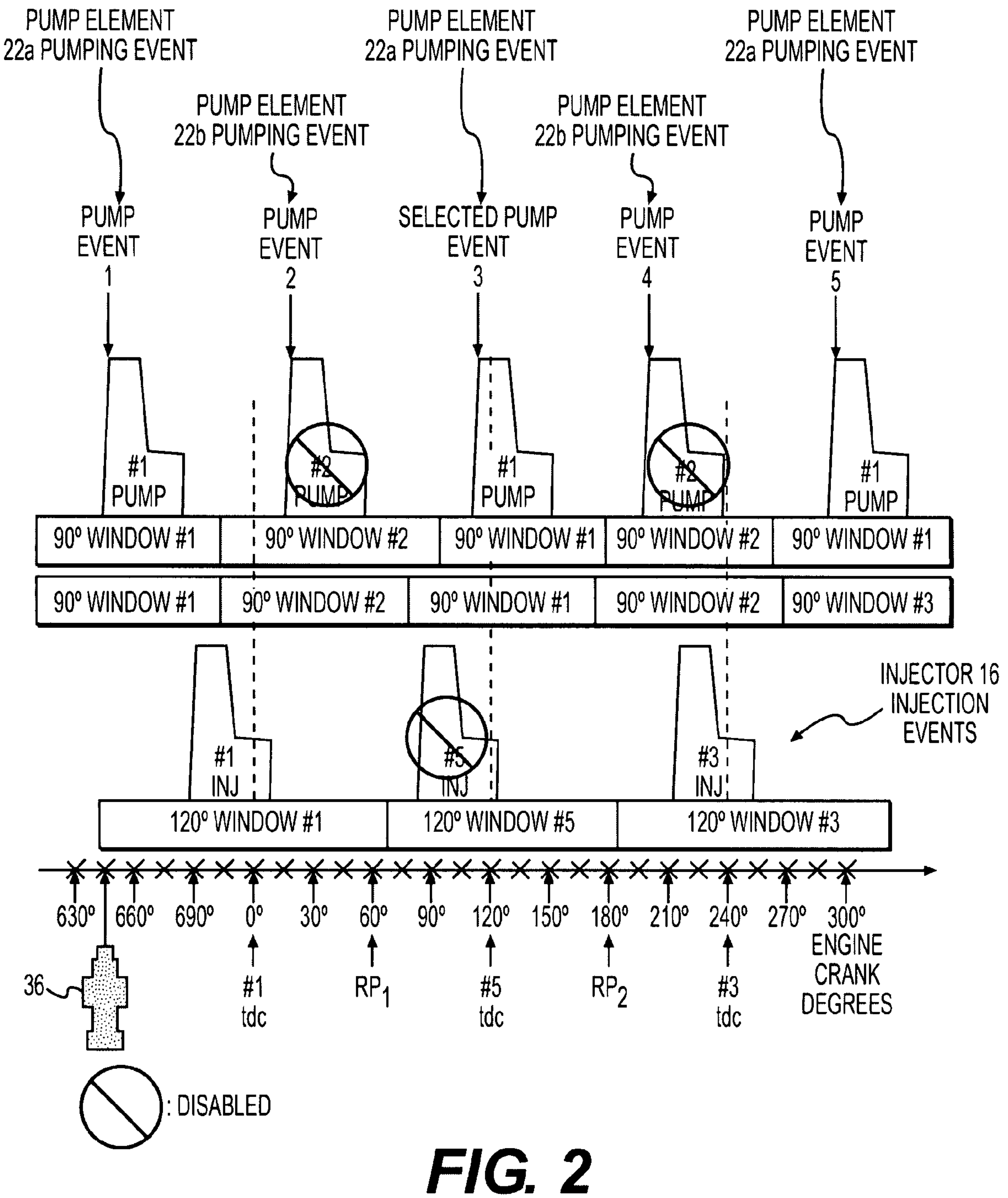
FIG. 2 is a schematic showing testing of a pump element pumping event, using the apparatus of FIG. 1.

In the FIG. 1 embodiment of the present disclosure, disabling "overlapping" injectors 16, for example, injector #5 in the FIG. 2 depiction of engine and pump timing events in an exemplary test sequence, is accomplished by software 64 in computer 40 that overrides the engine control program in ECM 28 to suspend operation of injector #5 during the test period. The test period shown in the FIG. 2 example includes an approximately 240° crank angle interval, that is from engine crank angle of 0° (corresponding to TDC of engine #1 piston) to a crank angle of 240° corresponding to TDC of the #3 piston. Of course, a longer or shorter test period could be used as best fits the particular application, as one skilled in the art would appreciate.

Also, for multi-pump element pumps, such as pump 12 in FIG. 1 embodiment, pumping events due to pump elements not being tested may also be disabled by software 64, as they would affect fuel rail pressure and "mask" the pressure rise due to the pump element being tested. In the FIG. 2 exemplary test, pumping events #2 and #4 from pump element 22*b* surrounding pumping event #3 of pump element 22*a* to be tested, are disabled e.g. by overriding the ECM 28 control of solenoid valve 34*b* during the test period.

One skilled in the art would appreciate that other means for disabling overlapping injectors and/or pumping events could be used. For example, switches installed at the overlapping injector 16 and pump element 22*b* under the direct control of computer 40 through service tool 50 could be used.

In the disclosed embodiment, after the operator selects the pump event to be measured and the engine has achieved a steady state condition (RPM, load, engine coolant temperature, etc.), then during a specific test period when fuel rail pressure measurements are to be taken, the test control program 60 in computer 40 controls software 64 to disable overlapping ones of injectors 16, and pumping events of the other pump element such as pump element 22*b* in the FIG. 2 example for that period of time. This momentary change in the normal engine operation should have only a small but tolerable effect on overall engine operation while essentially isolating the effect of the pump element, such as element 22*a*, on the fuel rail pressure, to allow fuel rail pressure measurements to be taken during the test period. Computer 40 also may include software 64*a* to reinstate the overridden injector operation and pump element cutouts immediately after the test period. Reinstating these operations would allow engine 14 to return to steady state operation, in the event the test is to be rerun one or more times e.g. to verify accuracy of the measurements.

Further, in accordance with the first aspect of the present disclosure, the test apparatus includes software for measuring the pressure in the fuel rail at at least two different engine crank angles surrounding the pumping event during the test period with the overlapping injectors and other pump element events disabled. As embodied herein, and with continued reference to FIG. 1, computer 40 includes software 66 to process (sample) fuel rail pressure sensor 36 signals, such as received indirectly by service tool 50 via ECM 28 or received directly and digitized, at preselected times (engine crank angles) during the test period. For example, and as depicted in FIG. 2, fuel rail pressure in rail 18 may be sampled at two positions surrounding the expected crank angle time of pumping event #3 of pump element 22*a*, namely, at the 60° and 180° engine crank angles that surround the expected time of pumping event #3. Other measurement crank angles and numbers of samples could, of course, be used. Also, depending upon the type of fuel rail pressure sensor/transducer 36 normally provided with engine 14, a fast-acting pressure transducer may be substituted for rail pressure sensor 36 or separately added as part of test apparatus 10, to improve speed and resolution of the pressure measurements.

As previously stated, and as embodied herein, computer 14 includes software 60 for controlling the overall testing sequence for fuel pump 12 and engine 14. Test control program 60 may include controlling the sequential operation of the providing software 62, the disabling software 64, and the measuring software 66, and associated hardware discussed previously. These functions of the pump testing sequence may be carried out concurrently with testing for verifying correct installation of gear-driven pump 12, as disclosed in concurrently filed application Ser. No. 11/976,164 entitled "Method and Apparatus for Determining Correct Installation for Gear-Driven Fuel Pump on a Fuel Injected IC Engine."

Further in accordance with the disclosure, the computer includes software for determining from the measured fuel rail pressures (or averaged measurements, if multiple test runs are conducted) a fuel delivery value for the pump. As embodied herein, computer 40 includes software 68 that converts the rail pressure rise, that is, increase in fuel rail pressure from a rail pressure measured before the selected pumping event to the pressure measured after the pumping event, into a net fuel flow into the rail due to the pumping event. Based on conventional compressibility relationships, the net fuel flow into the rail, such as rail 18 in the FIG. 1 embodiment, can be calculated using the measured rail pressures during the event, the known fuel rail volume, the bulk modulus of the fuel, and the elapsed time of the pumping event. Also, as the fuel bulk modulus may be temperature dependent, a fuel temperature, such as approximated by engine coolant temperature from sensor 38, may be used to refine the fuel delivery rate value calculation in some embodiments. One skilled in the art of designing test procedures for IC engine fuel supply systems would be able to select and adapt a suitable compressibility equation for a specific application.

Another possible event during the test period that may affect the accuracy of the rail pressure measurements is fuel rail system leakage. As such, in embodiments corresponding to the present disclosure, such as apparatus 10 of FIG. 1, computer 40 may also include software 68*a* for adjusting the determined fuel delivery rate values to account for the leakage. That is, total pump delivery rate would equal the delivery rate calculated from the measured rail pressure rise in the time period between the sampling times, plus the leakage rate during that time period. Leakage flow rates, average leakage rates available for that model fuel rail system, and stored in memory of computer 10 as a function of rail pressure. Or, the leakage rates may be determined from appropriate testing on the particular fuel supply system of engine 14 carried out concurrently with the fuel pump performance testing, such as using apparatus and methods disclosed hereinafter.

For engine applications having a fuel pump with only a single pump element, the results of the rail pressure measurements outlined above can be converted directly to a pump fuel delivery value. For engines with a multiple pump element pump, apparatus in accordance with the present disclosure may include software for repeating the test sequence using each of the other pump elements, before determining the pump fuel delivery rate value. Specifically, the programmed computer may include software to repeat the providing, disabling, and rail pressure measuring functions using each of the other pump elements. Also, the software for determining the pump fuel delivery rate value would include software to separately determine fuel delivery rate values for each of the pump elements and sum these to provide the pump fuel delivery rate value.

Figure 3:
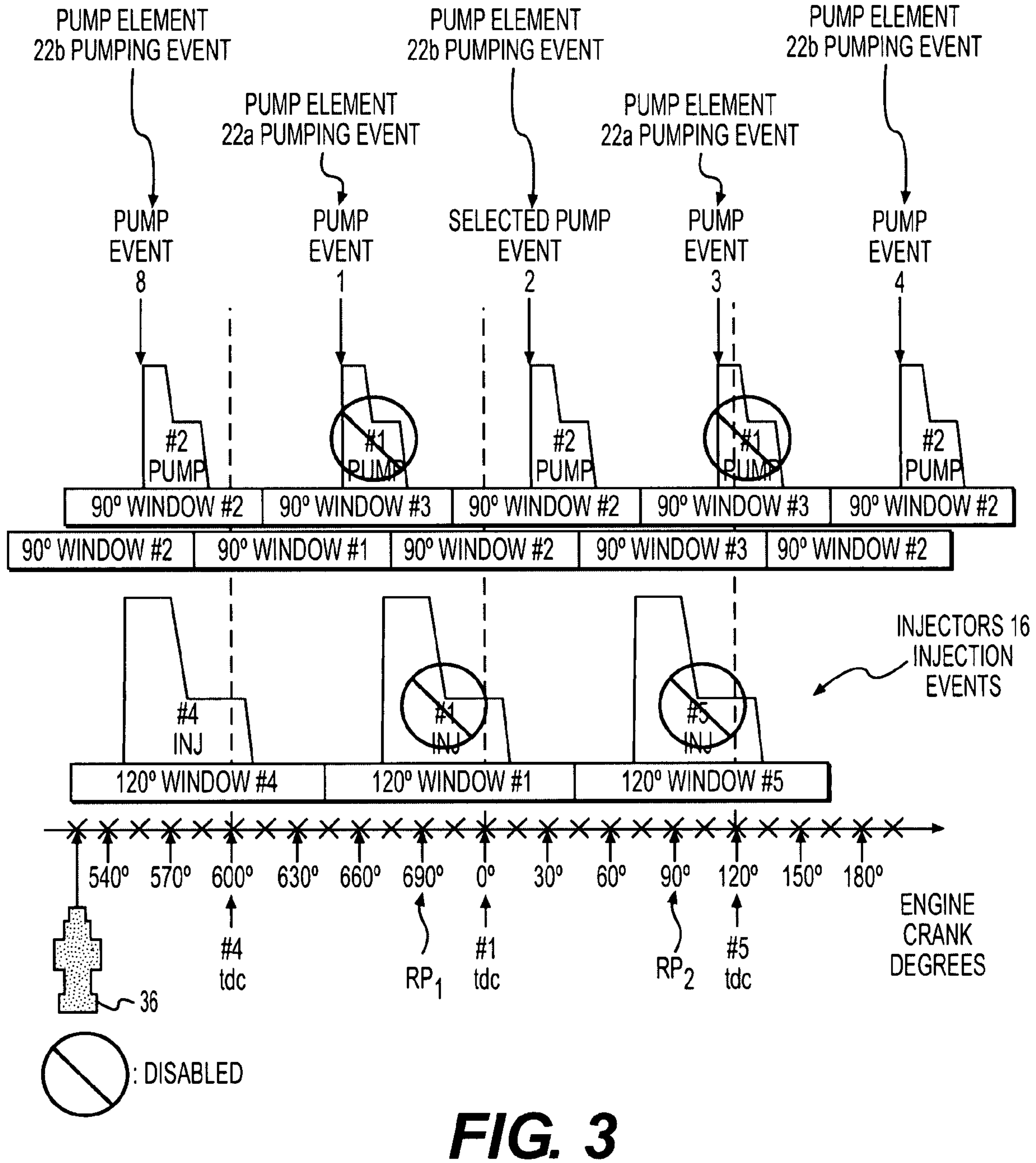
FIG. 3 is a schematic showing testing of a pump event from another pump element in the IC engine depicted in FIG. 1.

For example, in the embodiment depicted in FIG. 1, test sequence control program 60 in computer 40 is configured to conduct further testing using the second pump element (22*b* in this example). The depiction of an exemplary test using pump element 22*b* in FIG. 3 shows the selection of an appropriate pumping event and rail pressure sampling times (relative to engine crank angle), allowing identification of overlapping injectors and overlapping pump element 22*a* pumping events. As shown in FIG. 3, pumping event #2 at nominal 30° relative to top dead center of cylinder piston #1 was selected, and injectors #1 and #5, and pumping events #1 and #3 due to pump element 22*a*, were identified as "overlapping" by the program executing the test sequence in FIG. 4, using engine timing information typically available, such as in a "map" stored in ECM 28.

For fuel system having variable pump valve opening timing, such as shown in FIG. 1, computer 10 may have software that preliminarily ensures that the pump valve timing angle is set for maximum delivery rate during the related pumping event. This software may be part of software 62 for providing the pumping event, as shown in FIG. 1, or could be a separate software module. In either case, the software would cause ECM 28 to select the SOC angle from the stored SOC "map" that would provide maximum flow rate at the engine conditions of the pumping event. Also, the pump valve timing angle setting software may be configured to override ECM 28 and cause a specified SOC angle to be used, to allow testing at lower pump delivery rates, if desired.

Still further in accordance with a first aspect of the present disclosure, the test apparatus may also include the programmed computer having test enable software to confirm that the operating conditions of the engine, such as engine 14 in the FIG. 1 embodiment, are satisfactory, to allow testing sequence to commence. The enable software, which may be part of test control program 60, may include software for determining engine speed (RPM), load, rail pressure, as well as whether ECM rail pressure control is active. Other test enable programs would occur to the skilled artisan.

One skilled in the art also would recognize that depending upon the sophistication of the engine ECM, a separate service tool, such as service tool 50 in the FIG. 1 embodiment, may not be required. For example, if engine ECM already receives as inputs, and processes digitally, engine coolant temperature and fuel rail pressure signals, then computer 40 may be configured to be connected directly to the ECM for access to these signals. Moreover, one skilled in the art would appreciate that in some embodiments, parts or all of the pump testing software programmed in computer 40 could be incorporated in the engine ECM itself during manufacture, to be loaded and/or run by the ECM microcontroller upon suitable prompts. In such a case, an external computer, such as computer 40, may serve only for operator communication (e.g. prompts, testing status, results display, etc.), which could be provided by a less complex/lower cost device. In some embodiments, a suitably programmed engine ECM microcontroller may automatically execute the pump element tests at predetermined times during normal steady state engine operation, such as during cranking (starting) or an idle condition, if engine performance would not be degraded or made unsafe. The results could be displayed using conventional warning or text message devices, or merely stored to be accessed during normal engine service.

In accordance with another aspect of the present disclosure, apparatus is provided for determining a leakage rate in a fuel supply system of a fuel-injected IC engine. The apparatus includes a programmed computer interconnectable to the engine and having software to establish steady state engine operating conditions with the fuel rail pressure at a predetermined value.

Figure 6:
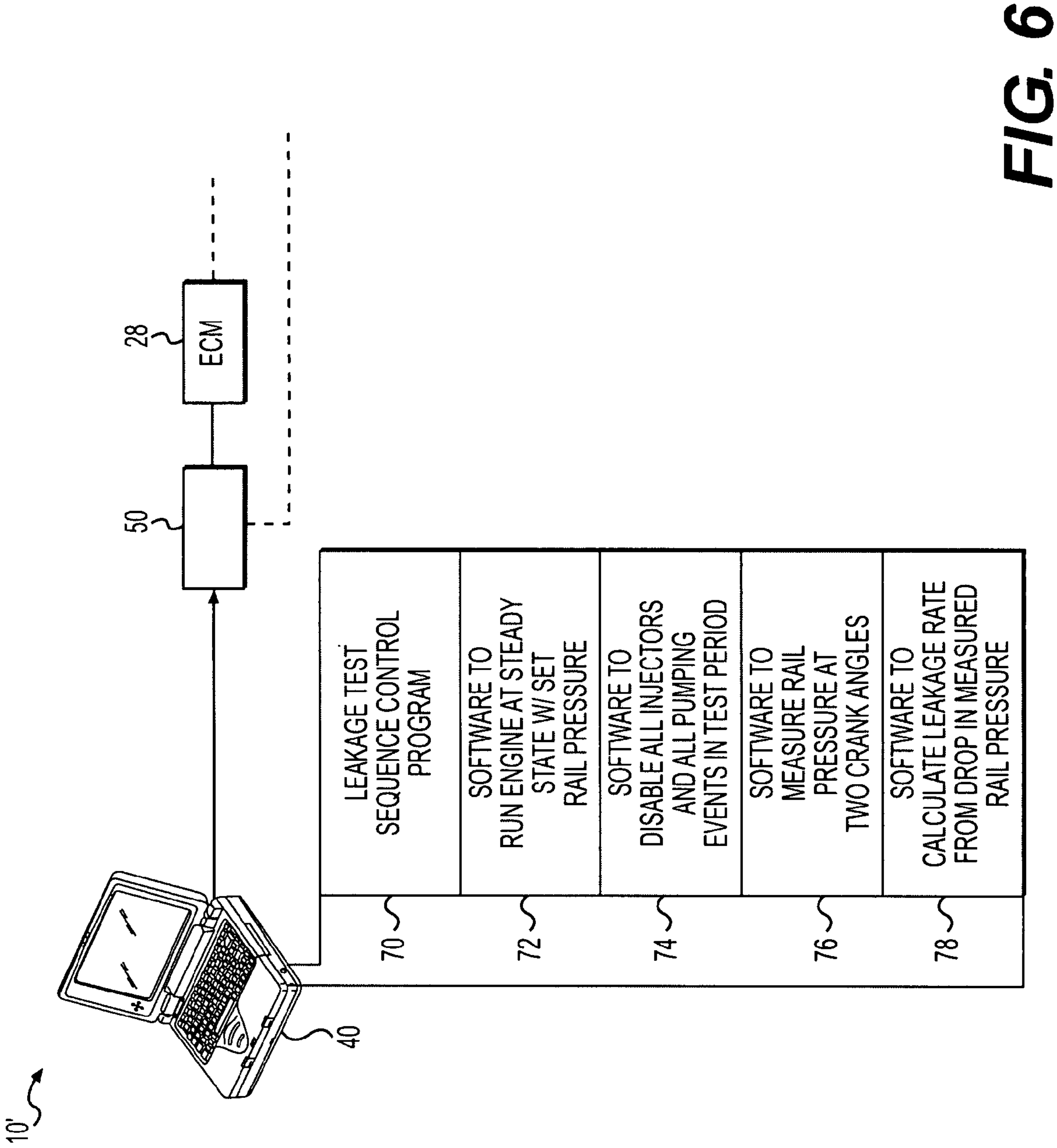
FIG. 6 is a schematic of a variation of the apparatus in FIG. 1 for testing for fuel rail leakage rate.

As embodied herein, apparatus 10 depicted in FIG. 1 can be used, with modification, to test for fuel rail leakage. As depicted in FIG. 6, the modified apparatus designated 10' includes leakage test control software 70 programmed in computer 40, for control of the leakage testing software, to be discussed hereinafter. It is understood in FIG. 6 that the interconnection between computer 40, service tool 50, ECM 28, and engine 14 would be essentially the same as in FIG. 1, the details of engine 14 and the interconnection not being shown in FIG. 6 for convenience. In particular, computer 40 also has software 72 to establish steady state conditions in engine 14 but with the pressure in fuel rail 18 set to a predetermined value. That is, software 72 is similar to software 62 as it entails causing ECM 28 to operate engine 14, preferably at a steady state condition. However, for purpose of leakage testing, the fuel rail pressure control feature of ECM 28 may be set to be active during the steady state operation of engine 14 to provide the predetermined steady state rail pressure. This pressure could be changed, i.e., raised or lowered, during subsequent tests to determine the quantitative effect of average fuel rail pressure on the rail leakage rate.

Figure 4:
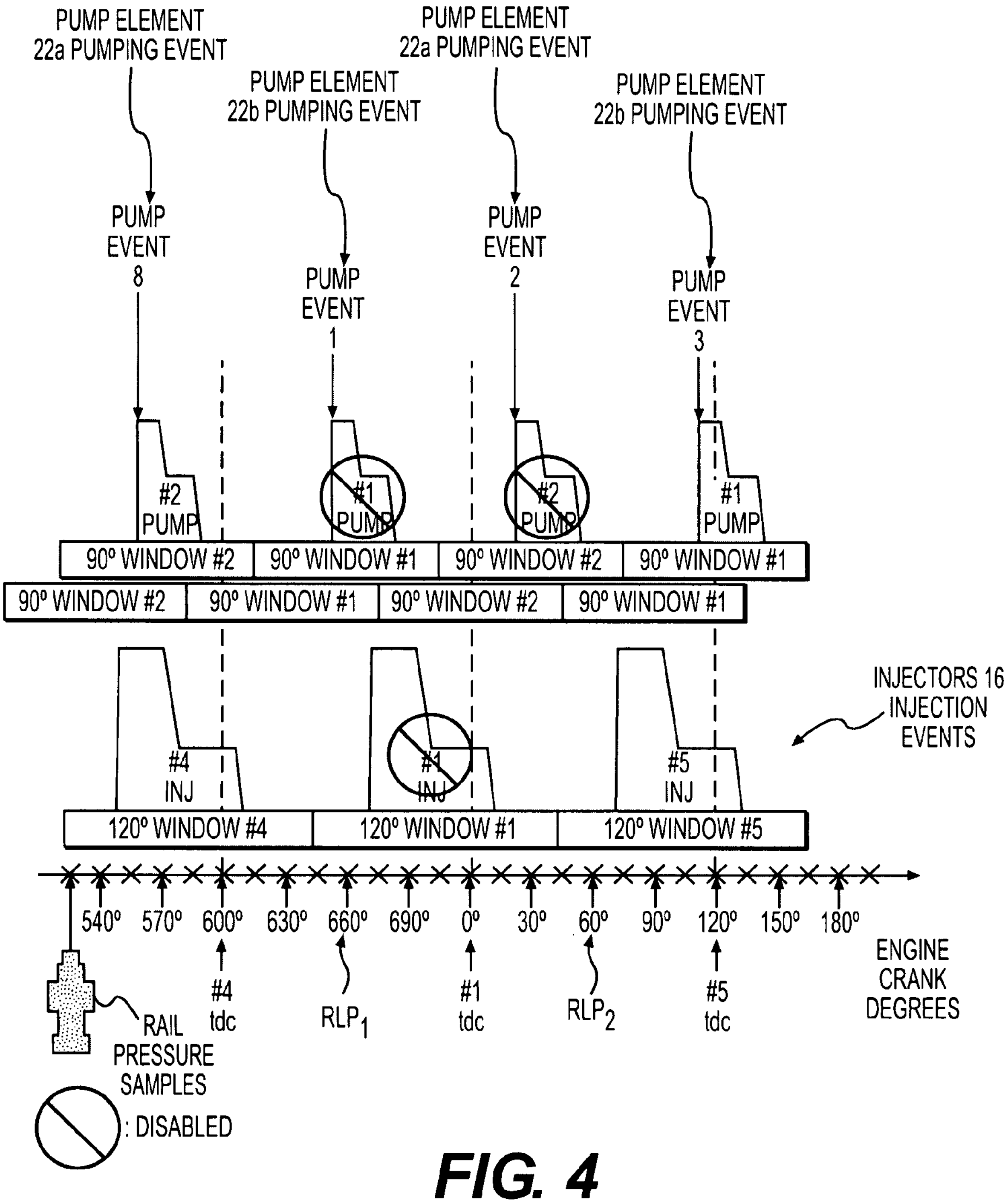
FIG. 4 is a schematic showing testing for fuel rail leakage in a IC engine, in accordance with another aspect of the present disclosure.

In accordance with this aspect of the present disclosure, the programmed computer also includes software for disabling all injectors and all pumping events during a test period. The software may also suspend ECM control of rail pressure during the test period, if active. As embodied herein, FIG. 4 depicts a leakage rate testing example using the apparatus 10' embodiment depicted in FIG. 6. In FIG. 4, the test was selected to be centered about the 0° crank angle (corresponding to TDC of #1 piston/cylinder) with rail leakage pressure measurements $RLP_1$ and $RLP_2$ taken at 660° and 60°, respectively. As such, injector #1 of injectors 16 identified as "overlapping," as were pumping events #1 and #2 (corresponding to pump element 22*a* and element 22*b*, respectively). These events would be disabled by software 74 overriding the engine control program in ECM 28. The actual test period chosen extends from a crank angle #660° to an angle$\geqq$60°, relative to TDC of #1 piston. As one skilled in the art would understand, no fuel inflow or outflow events, except rail leakage, would occur in the test period encompassing $RLP_1$ and $RLP_2$, so the pressure decay/drop in rail 18 can be attributable to leakage. This feature of software 74 is in contrast with software 64 for pump performance testing that allows a pumping event (the selected event only) to occur during the test period, but is otherwise similar.

Further in accordance with this aspect of the present disclosure, the programmed computer includes software for measuring (sampling) rail pressure at preselected first and second crank angles during the test period. As embodied herein, software 76 would sample rail pressure from sensor 36 in the FIG. 1 embodiment at two selected crank angles in the test period. For example, FIG. 4 shows $RLP_1$ at 660° crank angle and corresponding to a first crank angle, being advanced (in respect to engine timing) compared to $RLP_2$ at 60° (second) crank angle.

Still further in accordance with this aspect of the present disclosure, the programmed computer includes software for calculating the quantitative leakage rate based on the pressure drop between the first and second rail pressure measurements. As embodied, herein software 78 utilizes known compressibility equations to determine the leakage rate that would cause the rail pressure drop, such as between $RLP_1$ and $RLP_2$ in FIG. 4, in the elapsed time between the crank angles. Other factors utilized in the calculation by software 74 may include one or more of the rail volume, fuel bulk modulus, and engine coolant temperature (or other temperature representative of the fuel temperature in rail 18). The determined leakage rate may be considered representative of the rail leakage rate at a rail pressure corresponding to the average of $RLP_1$ and $RLP_2$. As stated previously, additional tests could be run at one or more different preset initial rail pressures to evaluate the leakage rate dependency on average rail pressure. For example, the preset initial rail pressures may be chosen to correspond to the expected average rail pressures in the pump performance testing aspect of this disclosure.

The resulting leakage rates could then be used to adjust fuel delivery values (rates) subsequently determined, as discussed previously in relation to the pump testing aspect of the present disclosure. Alternatively, the pressure decrease from $RLP_1$ to $RLP_2$ as a function of elapsed time during the leakage test period may be used to adjust the later of the two rail pressure measurements in the pump performance testing.

While pump performance may be evaluated on the basis of total measured pump delivery rate alone (possibly adjusted for average leakage rates), such as against a predetermined delivery rate value, it may be preferred to use evaluation guidelines which take into account a system requirement of actual fuel net flow into the fuel rail, requiring leakage rate measurements on the particular fuel system in question. That is, a pump may be deemed satisfactory for a particular application that has the simultaneous condition of "high" maximum delivery rate and "high" leakage rate or a condition of a lower pump delivery rate and a lower leakage rate. One skilled in the art would be able to establish such guidelines for particular applications. Such a system evaluation procedure may obviate the need for repair/replacement of a marginally unacceptable (low) pump and/or correction of a comparatively high leakage rate from the rail, and thus may be an advantage of performing leakage rate measurements on the particular fuel system in question.

INDUSTRIAL APPLICABILITY

For reasons stated previously, failure to achieve the design performance of a fuel rail supply system for a fuel injected IC engine having a correctly installed fuel pump may be attributable to degraded fuel pump performance and/or excessive fuel rail leakage. The apparatus discussed above and the methods to be described hereinafter of the present disclosure may provide significant savings in time and cost by providing in-situ testing of the rail system including the pump already installed on an engine, such as engine 14 of the FIG. 1 embodiment.

In general, the apparatus and methods of the present disclosure are applicable to all types of fuel injected IC engines e.g. diesel, gas, and natural gas fueled, using a fuel rail supply system fed by a fuel pump. Some embodiments of the inventive apparatus and methods are also applicable to fuel rail supply systems having a pump with multiple pumping elements, as will be discussed below.

Figure 5:
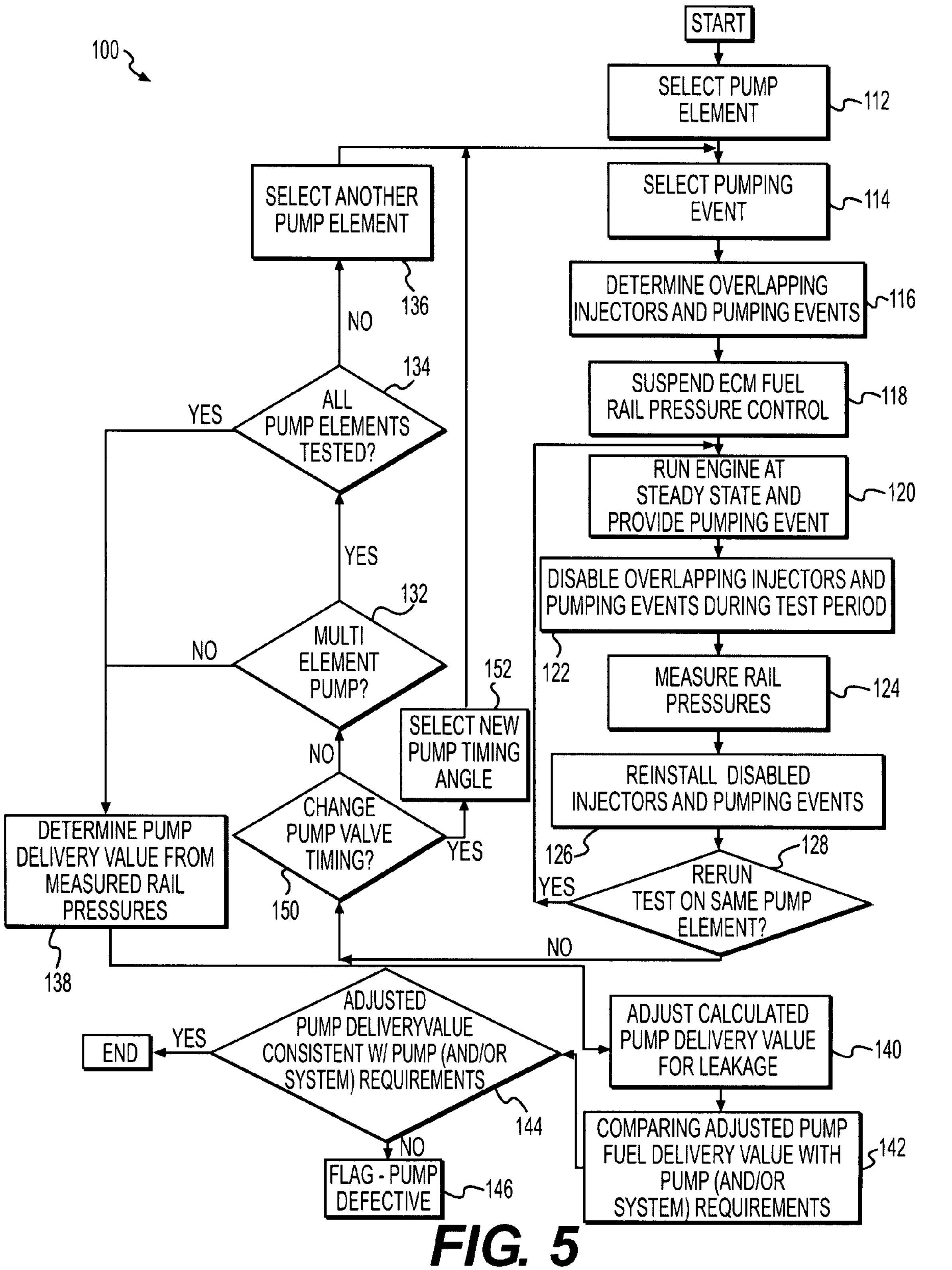
FIG. 5 is a flowchart depicting methods for determining performance of a fuel pump installed in a IC engine.

FIG. 5 depicts in flow-chart form an exemplary method 100 for testing performance a fuel pump installed on a fuel injected IC engine. While the depicted method 100 is directed to the engine application shown in FIG. 1, the scope of the inventive methods is not to be limited by the Figure but only by the appended claims and their equivalents.

Initially, a pump element is selected for testing, if the fuel rail supply system includes a pump with a multiple pump elements (block 112). For example, in the embodiment depicted in FIG. 1, with the exemplary tests depicted in FIGS. 2 and 4 pump element 22*a* or element 22*b* could be chosen for the first test, as a matter of convenience. For the remainder of this discussion, it is assumed that pump element 22*a* has been chosen for the first test run.

Further, at block 114, a particular pumping event due to the chosen pump element is selected for testing. In general the fuel pump will provide multiple, sequentially timed pumping events during the two complete cycles (720°) of a four-stroke engine, only one event of which may be used in each test run of the method. For example, in an exemplary test of the FIG. 1 embodiment, such as depicted in FIG. 2, pump event #5 of pump element 22*a* could be chosen. Other pumping events of the pump element 22*a* could, of course, be chosen for convenience.

Thereafter, in block 116, the testing method includes determining "overlapping" injectors. The method also may identify "overlapping" pumping events due to the other pump elements of a multi-element pump. As discussed previously, "overlapping" injectors (and pumping events, if applicable) can affect measured fuel rail pressure during testing and obscure or reduce the accuracy of fuel rail pressure measurements due to the selected pumping event. In carrying out the method element of block 116, the test operator can use the engine timing relationship of the various injectors and the design pumping events in conjunction with a desired test period surrounding the selected pumping event during which other effects on fuel rail pressure are to be minimized. As shown in the test example in FIG. 2, both pump events #2 and #4 due to the pump element 22*b* were disabled in the test period surrounding the pump event selected (pump event #3 of pump element 22*a*) while only the #5 injector was disabled.

One skilled in the art would also realize that the relationship between engine timing and the operation of the injectors can change with the value of other engine operating parameters, such as engine speed (RPM) and load (torque×speed). It may be preferred to account for these parameters when identifying such overlapping events by the use of the engine-operating map typically available and usually stored in an engine ECM. In the FIG. 2 testing example, injector #5 and pumping events #2 and #4 corresponding to pump element 22*b* were deemed to be overlapping.

Next, prior to running the engine to accomplish the testing, and in the event that a particular engine ECM includes a fuel rail pressure control function, this control may be suspended, as is depicted in block 118. For example, during normal operation the engine ECM may adjust engine speed and/or fuel pump delivery to maintain a preselected rail pressure, actions that could disrupt the testing or render the result inaccurate if allowed to occur during testing. For engines without ECM fuel rail pressure control, block 118 method element may be omitted.

Further, as depicted at block 120, the engine is run normally (without overlapping injectors and/or pumping events disabled) until steady state test conditions are reached. These conditions may be one or more of a specified engine speed (RPM), engine coolant temperature, load, etc.

Further in regard to the method depicted in FIG. 5, during the steady-state operation of the engine, the overlapping injectors and pumping events are momentarily disabled. See block 122. The test period during which they are disabled should surround the pumping event selected in block 112, that is, include crank angles before and after the nominal or design pumping event timing. The test period also should be commensurate with the determination in block 116 of "overlapping" injectors and pumping events. In the FIG. 2 testing example, the test period selected was about 30° to about 210° where injector #5 and pump element 22*b* pumping events #2 and #4 were disabled. Also, as discussed previously in regard to the apparatus shown in FIG. 1, disabling may be done electronically such as by momentarily overriding that portion of the ECM engine control program that controls injector operation and fuel pump element output solenoid operation. Or, alternatively, the electronic control could be provided by a completely independent engine test control program.

Concurrently with disabling overlapping injectors and pumping events, the method shown in FIG. 5 includes measuring fuel rail pressure due to the selected pumping event at least two crank angles. See block 124. This feature requires that the fuel rail pressure measurements be taken during the period when the overlapping injectors and pumping events are disabled but where the selected pumping event (block 114) of the respective pump element occurs (block 112). As discussed previously, the timing of the measurements can be electronically coordinated with the disabling operation. For example, in the FIG. 2 testing example, two fuel rail pressure measurements or "samples" $RP_1$ and $RP_2$ could be taken during the period injector #5 and pumping events #2 and #4 of pump element 22*b* are disabled. Also, the sampling times of $RP_1$ and $RP_2$, namely crank angles 60° and 180°, respectively located after the end of injector #1 event and before start of injector #3 event, are within the test period and were chosen to further isolate the pumping event #3 effect on fuel rail pressure.

Once the fuel rail pressure measurements are made, the method depicted in FIG. 5 may reinstate the disabled injectors and pumping events and return to a steady state condition (block 126) for possible further testing. The test sequence also could repeat the operations of blocks 120 to 126 one or more times to provide additional fuel rail pressure measurements surrounding the selected pumping event before the engine is shut down, as is represented in the FIG. 5 flow chart by logic block 128. The fuel rail pressure measurements could then be averaged to provide more accurate indication of the pump element performance. For example, in the FIG. 2 testing example, the $RP_1$ and $RP_2$ measurements may be repeated four times and the results averaged.

The further testing may include testing the same pump element and pumping event but at a different pump valve timing angle, such as to provide further pump performance envelope data at lower pump flow rates. Logic block 150 and change pump timing angle operation block 152 depict this aspect of the method disclosed in FIG. 5.

Depending upon a particular application (single pump element versus multiple element pump) logic steps in blocks 132 and 134 in the FIG. 5 embodiment provide further testing using each of the other pump elements. In the present exemplary system depicted in FIG. 1, pump element 22*b* would be selected in block 136, method elements corresponding to blocks 114-126 repeated, and respective values of $RP_1$ and $RP_2$ be determined.

In accordance with the method aspect of the present disclosure, the rail pressure measurements for each pump element are then used to calculate a pump fuel delivery rate value for that element (block 138). Standard compressibility equations can be used, as discussed previously, taking into account the fuel rail volume, bulk modulus of the fuel, fuel temperature, etc. The calculations may be done for each element, using respective measured pressures (which may be averaged pressures) and the results added to provide a fuel delivery rate value for the pump.

Figure 7:
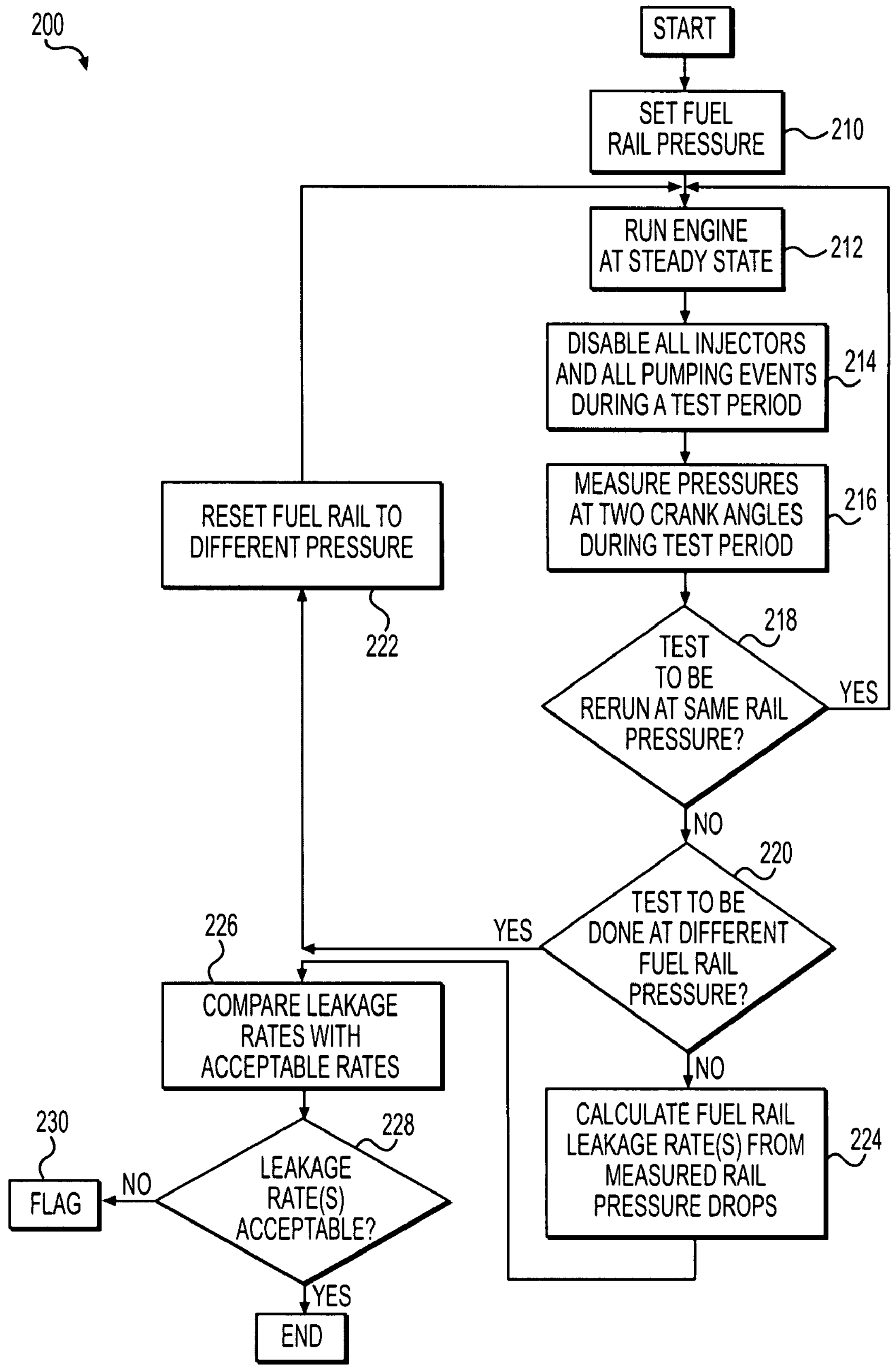
FIG. 7 is a flowchart testing for leakage rate determination using the apparatus of FIG. 6.

Further, it may be preferred that the calculated fuel delivery rate values be adjusted to account for rail leakage (block 140). Average leakage rate values may be known for the fuel system model, or they may be determined for the particular fuel system in question using other aspects of the apparatus and methods of the present disclosure, including the apparatus discussed previously and the methods to be discussed hereinafter. For instance, FIG. 7 depicts in flow chart form a method 200 for determining the fuel rail leakage in the engine application of FIG. 1, using apparatus 10' discussed previously in relation to FIG. 4.

Further in accordance with the pump performance testing method aspect of the present disclosure, the determined (or adjusted) pump delivery rate value is compared with a predetermined value. As embodied in FIG. 5, the predetermined fuel delivery rate value used in block 142 can be a design value, an end of life value, or other appropriate delivery rate value. If the determined delivery rate value is deemed unacceptable (logic block 144), the operator can be notified of the need for repair/replacement (flag block 146). Also, for multiple pump element pumps, the calculated fuel delivery rates for the individual pump elements may be compared with each other in block 142. If a substantial difference in delivery rate exist between one or more pump elements, this may be deemed indicative of a faulty pump element requiring repair/replacement.

Still, further, in block 42 the pump may additionally, or alternatively, be evaluated together with the actual fuel rail leakage rate for the particular fuel system in question on the basis of a predetermined fuel system required net flow into the rail, as discussed previously, to identify whether or not acceptable conditions (combined "high" pump flow rate plus "high" leakage flow rate or combined "low" pump flow but "low" leakage flow rate) may exist.

Further in accordance with yet another aspect of the present disclosure, a method is provided for determining a quantitative leakage rate in a fuel supply system of a fuel injected IC engine having one or more pumping elements supplying injectors via a fuel rail. The method includes first setting a fuel rail pressure. As embodied herein, and as depicted in FIG. 7, method 200 includes (block 210) setting the pressure in the fuel rail, such as fuel rail 18 in the FIG. 1 application, to a predetermined value, for example an average operating rail pressure for the engine. The rail pressure may alternatively be first set to a lower pressure, with the expectation that an additional test may be run at a higher rail pressure to better evaluate rail leakage, which may be pressure dependent for the particular application. Also, tests at various other pressures can be carried out in addition to the tests with two different pressures.

The rail pressure may be set by adjusting engine operating conditions to achieve the desired rail pressure during steady state operation (block 212). For engines with ECM control of fuel rail pressure, such as ECM 28 of engine 14 in FIG. 1, setting the rail pressure may include initially using the ECM control to provide the desired set pressure prior to the disabling method element (block 214, discussed below).

The leakage rate determining method further includes momentarily disabling all injectors and all pumping events during a test period. As embodied herein, and as depicted in the exemplary leakage test shown in FIG. 4, injector #1 of injector 16, pumping event #1 of pump element 22*a*, and pumping event #2 of pump element 22*b* were disabled during the test period which ran between about 630° and about 60°. During that period the only pressure change in fuel rail 18 would be expected to be due to leakage.

The method in accordance with the leakage rate determining aspect of the present disclosure further includes measuring rail pressures at first and second crank angles during the test period. As embodied herein, method 200 includes (block 216) measuring rail pressure at two crank angles, such as $RLP_1$ at 660° and $RLP_2$ at 60°. See FIG. 4. As would be readily understood, $RLP_1$ being earlier in engine time relative to $RLP_2$ would be higher in pressure than $RLP_2$, with the pressure drop ($RLP_1$-$RLP_2$) resulting from the leakage outflow from rail 18. Logic block 220 of method 200 provides that the measurements $RLP_1$ and $RLP_2$ may be repeated by reinstating the disabled injectors and pumping events and rerunning blocks 212-216 and the results averaged, if desired.

Still further, the leakage rate determining aspect of the method of the present disclosure includes calculating fuel rail leakage rate from the measured pressure drops. In block 224 of method 200 shown in FIG. 6, the pressure drops are converted to leakage rates using standard compressibility relationships, and appropriate factors (e.g. rail volume, fuel bulk modulus, fuel temperature in rail, etc. These leakage rates may be pressure dependent as discussed above.

Further, the calculated leakage rate can be compared to a predetermined acceptable leakage rate at block 226. If unacceptable, the test operator could be notified the need for repair/refurbishment of one or more fuel rail components, via logic block 228 and flag block 230. The acceptable leakage rate can be used in the pump evaluation method, such as to adjust calculated fuel delivery values in method 100 in FIG. 5 at block 140. Also, the pressure drops due to acceptable leakage rates measured in block 216 may be used to adjust measured rail pressures in other tests relating to the fuel rail and fuel pump, such as the tests to confirm correct fuel pump gear installation described in copending application Ser. No. 11/976,164.

It will be apparent to those skilled in the art that various modifications and variations can be made to the disclosed apparatus and methods for in-situ fuel pump performance testing and fuel rail leakage testing on a fuel injected IC engine. Other embodiments will be apparent to those skilled in the art from consideration of the specification and practice of the disclosed apparatus and methods. It is intended that the specification and examples be considered as exemplary only, with the true scope being indicated by the following claims and their equivalence.

What is claimed is:

1. A method for testing a fuel pump in a fuel supply system on a IC fuel injected engine, the pump having a pumping element for supplying fuel injectors via a fuel rail, the method comprising:

(a) providing a pump element pumping event;

(b) disabling overlapping injectors during a test period that includes the pumping event;

(c) measuring pressure in the rail at least two engine crank angles surrounding the pumping event during the test period; and (d) determining a fuel delivery rate value for the pump based on the measured rail pressures.

2. The method as in claim 1, further including comparing the pump fuel delivery value with a predetermined pump fuel delivery rate requirement.

3. The method as in claim 1, wherein determining the fuel delivery rate value includes calculating the fuel delivery rate value based on one or more parameters selected from a fuel rail system volume, a fuel bulk modulus, and an engine coolant temperature.

4. The method as in claim 1, wherein determining the fuel delivery rate value includes adjusting for fuel rail leakage.

5. The method as in claim 1, wherein the pump has multiple pump elements, and wherein the method further comprises repeating method elements (a)-(c) for each other pump element, and wherein element (d) includes determining fuel delivery rate values for each pump element based on the respective measured rail pressures and adding the fuel delivery rate values to determine the pump fuel delivery rate value.

6. The method as in claim 1, wherein method elements (a)-(c) are carried out during normal operation of the engine.

7. The method as in claim 1, wherein the fuel supply system includes a pump valve having a variable opening timing angle, for controlling fuel delivery to the rail, and wherein the method includes preliminary setting the pump valve timing angle to achieve maximum pump element delivery rate.

8. The method as in claim 7, wherein the method includes repeating method elements (a)-(d) with the pump valve timing set to achieve a lower pump element delivery rate.

9. The method as in claim 7, wherein the method further includes comparing the determined maximum pump delivery rate with a rate leakage determined for the particular system with the installed pump, and determining whether a predetermined acceptable maximum pump delivery rate/system leakage rate condition exists.

10. Apparatus for testing a fuel pump in a fuel supply system on a fuel injected IC engine, the pump having a pumping element for supplying fuel injectors via a fuel rail, the apparatus comprising:

a computer programmed with (a) software for providing a pump element pumping event;

(b) software for disabling overlapping injectors during a test period that includes the pumping event;

(c) software for measuring pressure in the rail at least two engine crank angles surrounding the pumping event during the test period; and (d) software for determining a pump fuel delivery rate value based on the measured rail pressures, wherein the computer is operatively interconnectable to the engine.

11. The apparatus as in claim 10, wherein the IC engine includes an engine control module (ECM) having a microcontroller programmed with an engine control program, and wherein the programmed computer is operatively connectable to the ECM.

12. The apparatus as in claim 11, further comprising a service tool, wherein the programmed computer is interconnectable to the ECM through the service tool.

13. The apparatus as in claim 11, wherein fuel supply system includes a pump valve having a variable opening timing angle, wherein an engine control module (ECM) controls the timing angle setting, and wherein the software for providing a pump element pumping event includes software for preliminarily causing the ECM to set the pump valve timing to achieve a fuel delivery value selected from a predetermined high value delivery rate and a predetermined low delivery rate value.

14. The apparatus as in claim 13, wherein the pump valve is solenoid-activated, wherein the ECM includes start of current (SOC) timing angles, and wherein the computer includes software for causing the ECM to set the soc angle to achieve, respectively the high or lower pump element delivery rate values.

15. The apparatus as in claim 10, wherein the software for disabling overlapping injectors also includes software for disabling overlapping pumping events during the test period.

16. The apparatus as in claim 10, wherein the programmed computer is a stand-alone test unit and an engine control module (ECM) computer.

17. A method for determining a quantitative leakage rate in a fuel supply system of a fuel injected IC engine, the fuel system including a fuel pump with one or more pumping elements supplying injectors via a fuel rail, the method comprising:

(a) establishing steady state engine operating conditions with fuel rail pressure at a predetermined value;

(b) disabling all injectors and all pumping events during a test period;

(c) measuring rail pressure at preselected first and second crank angles during the test period, the first crank angle being advanced relative to the second crank angle; and (d) calculating the leakage rate based on a pressure drop determined from the measured rail pressure of the first crank angle relative to the measured rail pressure at the second crank angle.

18. The method as in claim 17, wherein the calculation is based on one or more parameters selected from a fuel rail system volume, a fuel bulk modulus, and an engine coolant temperature.

19. The method as in claim 17, wherein (i) the disabled injectors and pumping events are reinstated, and (ii) method elements (a)-(d) are repeated at a different predetermined rail pressure value.

20. The method as in claim 17, wherein the engine includes an ECM having a fuel rail pressure control function, and wherein establishing steady state conditions includes using the rail pressure control function to provide the predetermined rail pressure value.

* * * * *